United States Patent [19]
Frankholz

[11] Patent Number: 5,251,811
[45] Date of Patent: Oct. 12, 1993

[54] TEMPERATURE-SETTING SYSTEM FOR THERMOSTATIC MIXING VALVE

[75] Inventor: Christian Frankholz, Schwerte, Fed. Rep. of Germany

[73] Assignee: FriedrichGrohe Aktiengesellschaft, Hemer, Fed. Rep. of Germany

[21] Appl. No.: 987,112

[22] Filed: Dec. 4, 1992

[30] Foreign Application Priority Data

Dec. 18, 1991 [DE] Fed. Rep. of Germany ....... 4141791

[51] Int. Cl.⁵ .............................................. G05D 23/13
[52] U.S. Cl. ..................................... 236/12.16; 236/42
[58] Field of Search .................... 236/12.1, 12.16, 42, 236/43, 99 R

[56] References Cited

U.S. PATENT DOCUMENTS

| | | | |
|---|---|---|---|
| 4,508,263 | 4/1985 | Pedersen et al. | 236/42 |
| 4,681,254 | 7/1987 | Kammerer | 236/42 |
| 4,739,793 | 4/1988 | Vollmer | 236/42 X |
| 5,143,286 | 9/1992 | Hansen et al. | 236/42 |

FOREIGN PATENT DOCUMENTS 3530812 3/1987 Fed. Rep. of Germany .

*Primary Examiner*—William E. Tapoicai

*Attorney, Agent, or Firm*—Herbert Dubno; Andrew Wilford

[57] ABSTRACT

A thermostatically regulated mixing valve having a housing extending along an axis and a stem in the housing axially displaceable to adjust the thermostatically regulated temperature of the valve has a control assembly with a nut threaded on the housing, axially linked to the valve stem, and rotatable about the axis in one direction to move axially inward and move the stem axially inward and rotatable in the opposite direction to move axially outward and move the stem axially outward. An abutment sleeve is fixed to the valve housing and a sleevelike knob engages over the nut and abutment sleeve and is formed with an inwardly projecting stop. Splines on the knob and on the nut rotationally couple same together but permit relative axial movement so that the knob rotates with the nut but does not move axially therewith. A stop ring between the knob and the sleeve has an outwardly projecting stop angularly engageable with the stop of the knob and further splines on the ring and on the knob rotationally couple same together and permit same to be fixed angularly relative to each other in any of a multiplicity of angularly offset positions.

8 Claims, 2 Drawing Sheets

TEMPERATURE-SETTING SYSTEM FOR THERMOSTATIC MIXING VALVE

FIELD OF THE INVENTION

The present invention relates to a thermostatically regulated mixing valve. More particularly this invention concerns a temperature-setting and -limiting arrangement for such a valve.

BACKGROUND OF THE INVENTION

A standard thermostatically regulated valve such as described in German patent 3,530,812 filed Aug. 29, 1985 by J. Kostorz has hot- and cold-water inlets connected to respective valve seats whose other sides open into an outlet compartment from which tempered water flows. A double valve body is displaceable in one direction to increase the flow from one of the inlets to the outlet compartment and decrease the flow from the other inlet and is oppositely movable for the opposite effect. This valve body can be moved by axially displacing an externally displaceable stem, and is also provided with a temperature-sensitive element in the outlet compartment that can change length to move the valve element and keep it at the setting it is originally put into. Thus once a given mixed-water temperature is set, the temperature-sensitive element will automatically move the valve bodies in response, for instance, to varying supply temperatures to keep the output temperature steady.

The manual setting of such a valve is typically by means of a knob threaded on the rotatable and axially displaceable valve stem and itself constrained against axial movement, so that as it is rotated the stem is moved axially. Thus to increase the temperature the knob is rotated in one direction, thereby moving the stem axially one way, and to decrease the temperature the knob is screwed oppositely.

It is standard to provide a stop that prevents the knob from being rotated in the direction increasing temperature beyond a predetermined maximum-temperature position. This stop prevents the user from scalding himself or herself with water that is too hot. As a rule the stop is adjustable by means of a tool in order to change the maximum-temperature setting.

In some jurisdictions the maximum-temperature setting must be fixed, that is not within the control of the user, at least without using tools. The standard valve described above cannot be used in these regions.

OBJECTS OF THE INVENTION

It is therefore an object of the present invention to provide an improved thermostatically controlled valve.

Another object is the provision of such an improved thermostatically controlled valve which overcomes the above-given disadvantages, that is whose maximum-temperature setting cannot be changed by a child or someone not familiar with the valve and equipped with some tools.

SUMMARY OF THE INVENTION

A thermostatically regulated mixing valve having a housing extending along an axis and a stem in the housing axially displaceable to adjust the thermostatically regulated temperature of the valve has according to the invention a control assembly with a nut threaded on the housing, axially linked to the valve stem, and rotatable about the axis in one direction to move axially inward and move the stem axially inward and rotatable in the opposite direction to move axially outward and move the stem axially outward. An abutment sleeve is fixed to the valve housing and a sleevelike knob engages over the nut and abutment sleeve and is formed with an inwardly projecting stop. Interengaging formations (e.g. splines) on the knob and on the nut rotationally couple same together but permit relative axial movement so that the knob rotates with the nut but does not move axially therewith. In accordance with the invention a stop ring between the knob and the sleeve has an outwardly projecting stop angularly engageable with the stop of the knob and interengaging formations on the ring and on the knob rotationally couple same together and permit same to be fixed angularly relative to each other in any of a multiplicity of angularly offset positions.

With this system it is therefore necessary to get into the mechanism of the control assembly to change the high-temperature cutoff setting. This therefore cannot be done by a child or by someone who is not familiar with the setting-change procedure.

According to another feature of the invention the formations on the sleeve are axially limited and the sleeve is formed adjacent its formations with a region free of such formations. The ring is displaceable axially in the sleeve between a set position level and engaged with the sleeve formations and an adjustment position level with the formation-free region and rotatable relative to the sleeve. A spring braced between the sleeve and the ring urges the ring into the set position. A retaining ring engaged over the sleeve axially rearwardly engages the stop ring in the set position thereof.

The sleeve according to the invention has an axial outer end wall formed with at least one throughgoing hole aligned axially with the stop ring so that a tool can be inserted through the hole to push the stop ring into the adjustment position. The knob is provided with an axial outer end cap and the knob and end cap are provided with mutually interengaging screwthreads holding them together. Thus it is necessary to remove the end cap and insert a tool into the sleeve hole to change the temperature setting.

BRIEF DESCRIPTION OF THE DRAWING

The above and other objects, features, and advantages will become more readily apparent from the following, reference being made to the accompanying drawing in which.

SPECIFIC DESCRIPTION

Figure 1:
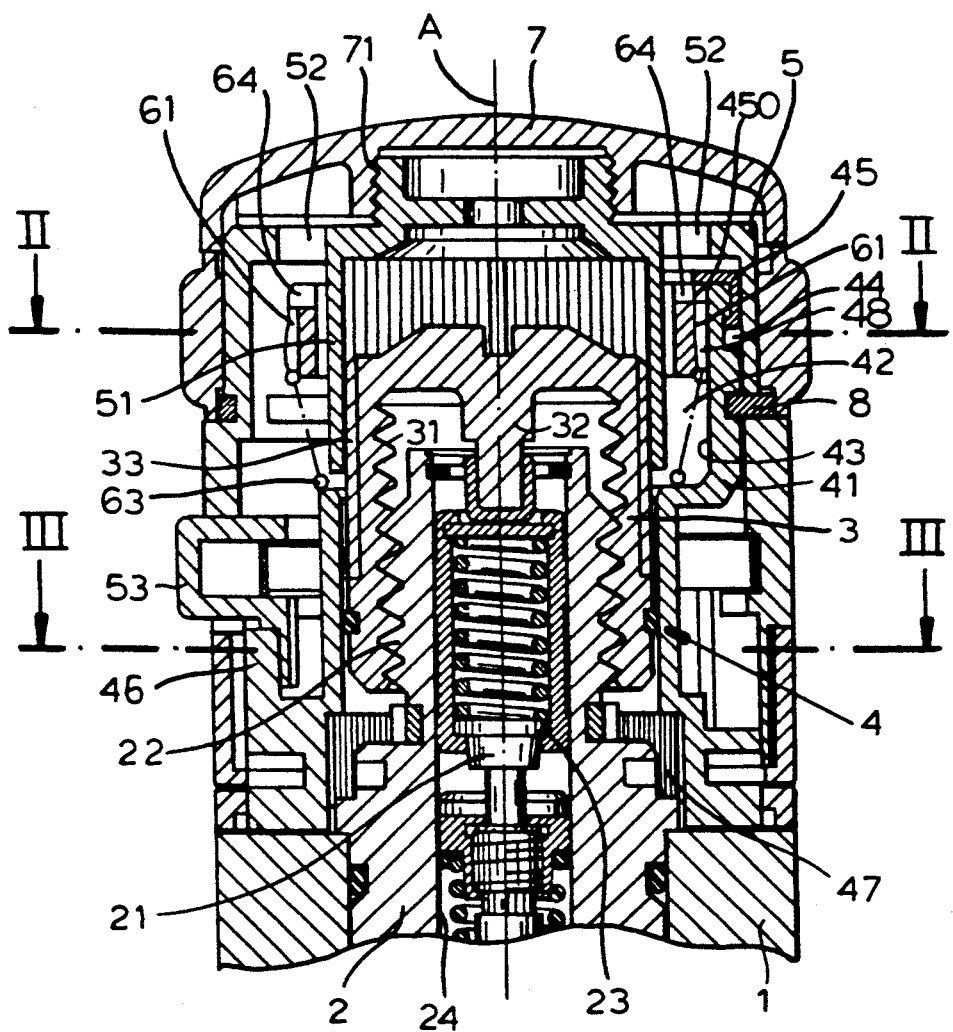
FIG. 1 is an axial section through the control knob assembly of this invention.

As seen in the drawing, a thermostatically regulated valve has a tubular valve housing 2 centered on an axis A and screwed solidly into a housing 1 to project therefrom. This valve housing 2 has a cylindrical passage 24 centered on the axis A and slidably receiving an axially displaceable actuating stem 21 carrying on its outer end a spring-loaded overload protector 23. The axial position of the stem 21 determines the desired value for the output temperature of the unillustrated mixing valve, with a temperature-sensitive element in the valve regulating this temperature to maintain it at the set level.

A nut 3 is formed internally with a screwthread 31 that is engaged over an external screwthread 22 on the valve housing 2. This nut 3 has an axially extending projection or pusher rod 32 that engages the stem 21 via the overload protector 23 so that when the nut 3 is rotated about the axis A in one direction it pushes the stem 21 down and when rotated oppositely it allows the stem 21 to rise. Thus the nut 3 moves angularly and axially as it is used to adjust the temperature.

An abutment sleeve 4 is axially fixed on the valve housing 2 and rotationally arrested thereon by splines 47 formed on the radially inner surface of its axially inner end and on the radially outer surface of the housing 2. This sleeve 4 has an enlarged outer end 41.

A cup-shaped knob 5 is secured on the stationary sleeve 4 by a clip 8 of the type described in commonly owned and copending application Ser. No. 969,127. The knob 5 has an axially inwardly projecting portion 51 coupled rotationally by splines 33 with the nut 3 so that the knob 5 can rotate about the axis A but not move along this axis A while the nut 3 is rotationally coupled to it and can move both axially and angularly.

The outer end 41 of the stationary sleeve 4 and the inner portion 51 of the knob 5 are spaced radially apart to form an annular compartment 42 holding a temperature-setting stop ring 6. The inner surface of the sleeve part 41 is formed in its uppermost region with splines 48 and immediately axially inward therefrom with a smooth spline-free region 43. The ring 6 is formed with external splines 61 that can mesh with the splines 48 in any of a multiplicity of angularly relatively offset positions. A spring 63 braced against a shoulder of the stationary sleeve 4 pushes the ring 6 axially outward into abutment with an edge 450 of a holding ring 45 secured axially in a groove 44 of the stationary sleeve 4. Thus this ring 6 is normally rotationally locked to the stationary sleeve 4 in the illustrated set position. The top of the knob 5 is covered by a cap 7 secured by screwthreads 71 to the knob 5. In addition the knob 5 is formed in axial alignment with the ring 6 with axially throughgoing holes 52 that are exposed when the cap 7 is removed.

Figure 2:
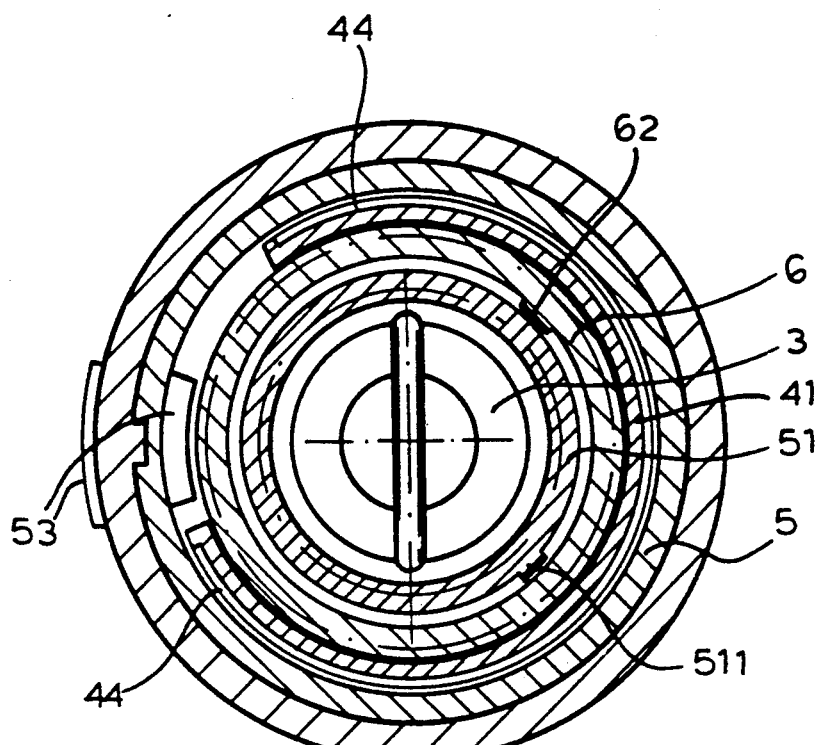
FIGS. 2 and 3 are sections taken along respective lines II—II and III—III of FIG. 1.

As better shown in FIG. 2, the ring 6 is formed with a radially outwardly projecting bump or stop 62 that can engage angularly with a radially inwardly projecting bump or stop 511 formed on the skirt 51 of the knob 5. When the stops 62 and 511 come into angular engagement with each other, which happens when the knob 5 is turned in the direction increasing the water temperature, further rotation of the knob 5 is impossible. Thus the angular position of the stop 62 determines the maximum high temperature the valve can output.

To adjust the maximum-temperature setting, the cap 71 is removed and a tool such as a screwdriver is inserted through one of the holes 52 to push the ring 6 down until the splines 48 and 61 are out of mesh with each other. In fact the axial outer face of the ring 6 is formed with notches 64 into which this tool can engage to rotationally couple the ring 6 when thus depressed into its adjustment position to the knob 5. When thus coupled together the ring 5 is turned until the water outputted by the valve is the right maximum temperature, then the tool is withdrawn to fix this setting.

Figure 3:
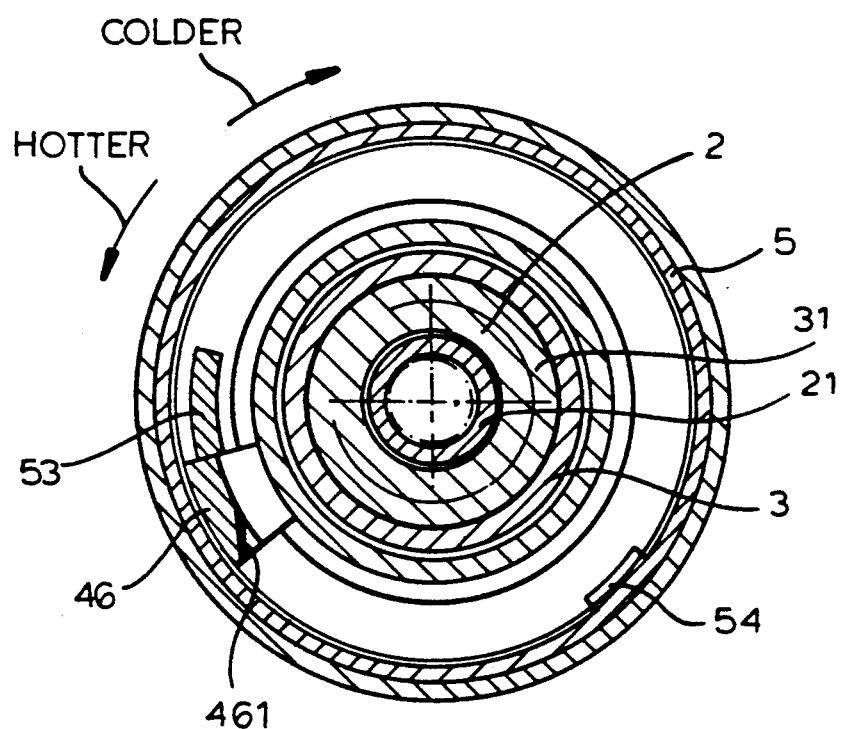

In addition the knob 5 is provided with a radially displaceable stop 53 engageable with another stop 46 fixed on the stationary sleeve 4. As seen by a comparison of FIGS. 2 and 3, the stop 53 is positioned so that it engages the stop 46 before the stops 62 and 511 engage each other, so that it sets a lower hot-water temperature, typically around 38° C. Thus during normal use the maximum high temperature is limited by interaction of the stops 53 and 46, and in fact the low temperature by interengagement of the stop 46 with a maximum cold stop 54 also formed on the knob 5. When a higher temperature is needed, the stop 53 is depressed so it can move past the stop 46 until the stops 62 and 511 engage each other and prevent further rotation of the knob 5. When the knob 5 is turned back, a cam flank 461 on the stop 46 momentarily inwardly deflects the stop 53 to allow it to move back past this stop 46.

We claim:

1. In combination with a thermostatically regulated mixing valve having a housing extending along an axis and a stem in the housing axially displaceable to adjust the thermostatically regulated temperature of the valve, a control assembly comprising:
   a nut threaded on the housing, axially linked to the valve stem, and rotatable about the axis in one direction to move axially inward and move the stem axially inward and rotatable in the opposite direction to move axially outward and move the stem axially outward;
   an abutment sleeve fixed to the valve housing;
   a sleevelike knob engaged over the nut and abutment sleeve and formed with an outwardly projecting stop;
   interengaging formations on the knob and on the nut rotationally coupling same together but permitting relative axial movement, whereby the knob rotates with the nut but does not move axially therewith;
   a stop ring between the knob and the sleeve having an inwardly projecting stop angularly engageable with the stop of the knob; and
   interengaging formations on the ring and on the sleeve rotationally coupling same together and permitting same to be fixed angularly relative to each other in any of a multiplicity of angularly offset positions.

2. The valve control assembly defined in claim 1 wherein the formations on the sleeve are axially limited and the sleeve is formed adjacent its formations with a region free of such formations, the ring being displaceable axially in the sleeve between a set position level and engaged with the sleeve formations and an adjustment position level with the formation-free region and rotatable relative to the sleeve.

3. The valve control assembly defined in claim 2, further comprising
   a spring braced between the sleeve and the ring and urging the ring into the set position.

4. The valve control assembly defined in claim 2, further comprising
   a retaining ring engaged over the sleeve and axially rearwardly engaging the stop ring in the set position thereof.

5. The valve control assembly defined in claim 2 wherein the knob has an axial outer end wall formed with at least one throughgoing hole aligned axially with the stop ring, whereby a tool can be inserted through the hole to push the stop ring into the adjustment position.

6. The valve control assembly defined in claim 1 wherein the knob is provided with an axial outer end cap.

7. The valve control assembly defined in claim 6 wherein the knob and end cap are provided with mutually interengaging screwthreads.

8. In combination with a thermostatically regulated mixing valve having a housing extending along an axis and a stem in the housing axially displaceable to adjust the thermostatically regulated temperature of the valve, a control assembly comprising:
- a nut threaded on the housing, axially linked to the valve stem, and rotatable about the axis in one direction to move axially inward and move the stem axially inward and rotatable in the opposite direction to move axially outward and move the stem axially outward;
- an abutment sleeve fixed to the valve housing;
- a sleevelike knob engaged over the nut and abutment sleeve and formed with an outwardly projecting stop;
- interengaging formations on the knob and on the nut rotationally coupling same together but permitting relative axial movement, whereby the knob rotates with the nut but does not move axially therewith;
- a stop ring between the knob and the sleeve having an inwardly projecting stop angularly engageable with the stop of the knob;
- interengaging formations on the ring and on the sleeve rotationally coupling same together and permitting same to be fixed angularly relative to each other in any of a multiplicity of angularly offset positions, the formations on the sleeve being axially limited and the sleeve being formed adjacent its formations with a region free of such formations, the ring being displaceable axially in the sleeve between a set position level and engaged with the sleeve formations and an adjustment position level with the formation-free region and rotatable relative to the sleeve; and
- a spring braced between the sleeve and the ring and urging the ring into the set position.

* * * * *